United States Patent [19]
Skovgaard

[11] Patent Number: 5,138,462
[45] Date of Patent: Aug. 11, 1992

[54] TV-SET HAVING SCREEN COVERING MEANS

[75] Inventor: Allan Skovgaard, Holstebro, Denmark

[73] Assignee: Bang & Olufsen A/S, Holstebro, Denmark

[21] Appl. No.: 682,305

[22] Filed: Apr. 9, 1991

Related U.S. Application Data

[63] Continuation of Ser. No. 302,335, Jan. 27, 1989, abandoned.

[30] Foreign Application Priority Data

Jan. 27, 1988 [DK] Denmark ................. 381/88

[51] Int. Cl.⁵ ............................... H04N 5/64
[52] U.S. Cl. ........................ 358/254; 312/7.2
[58] Field of Search ............. 358/248, 254, 255; 312/7.2, 7.1, 20, 21, 22, 29, 297; 455/347

[56] References Cited

U.S. PATENT DOCUMENTS 4,358,792 11/1982 Domoleczny et al. ............. 358/254

Primary Examiner—Edward L. Coles, Sr.
Assistant Examiner—Thomas D. Lee
Attorney, Agent, or Firm—Antonelli, Terry, Stout & Kraus

[57] ABSTRACT

Between the picture screen and a front glass of a TV-set is arranged a curtain system for covering the screen when the set is not in use. The curtain opens automatically in response to the set being switched on or, through a delay, the curtain is not opened until the picture has been fully established. When the set is switched off the curtain is actuated to be closed, and only thereafter the set itself will be switched off.

9 Claims, 1 Drawing Sheet

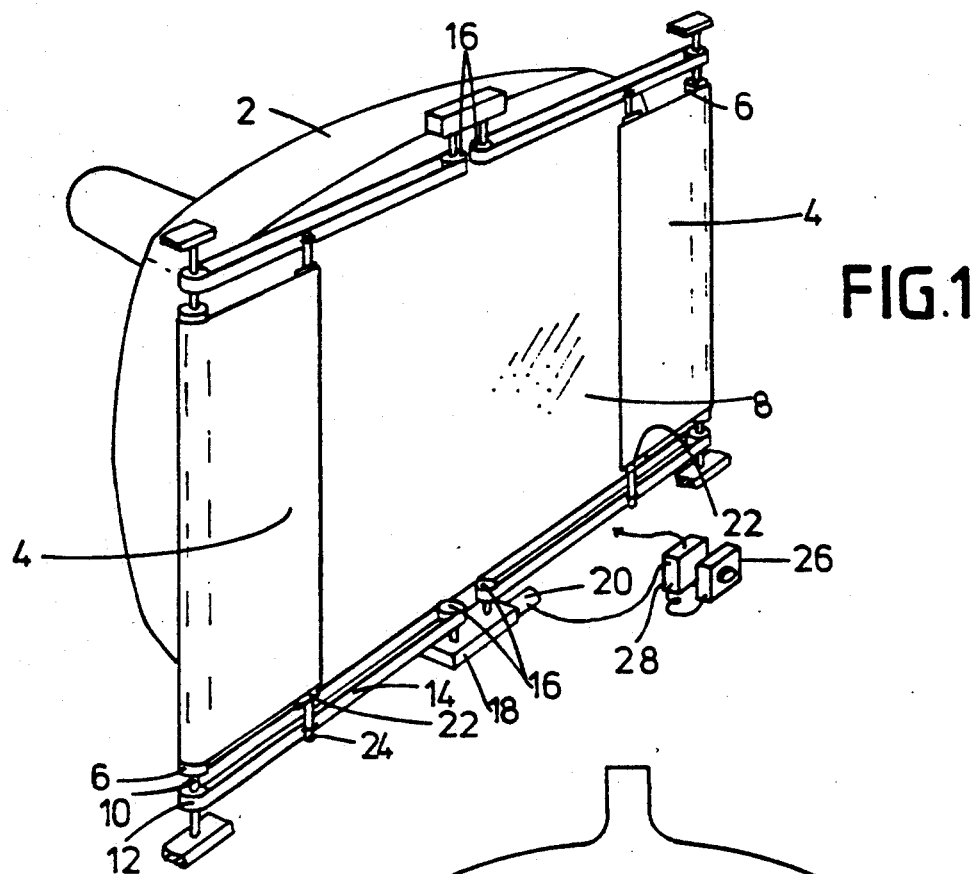
FIG. 1
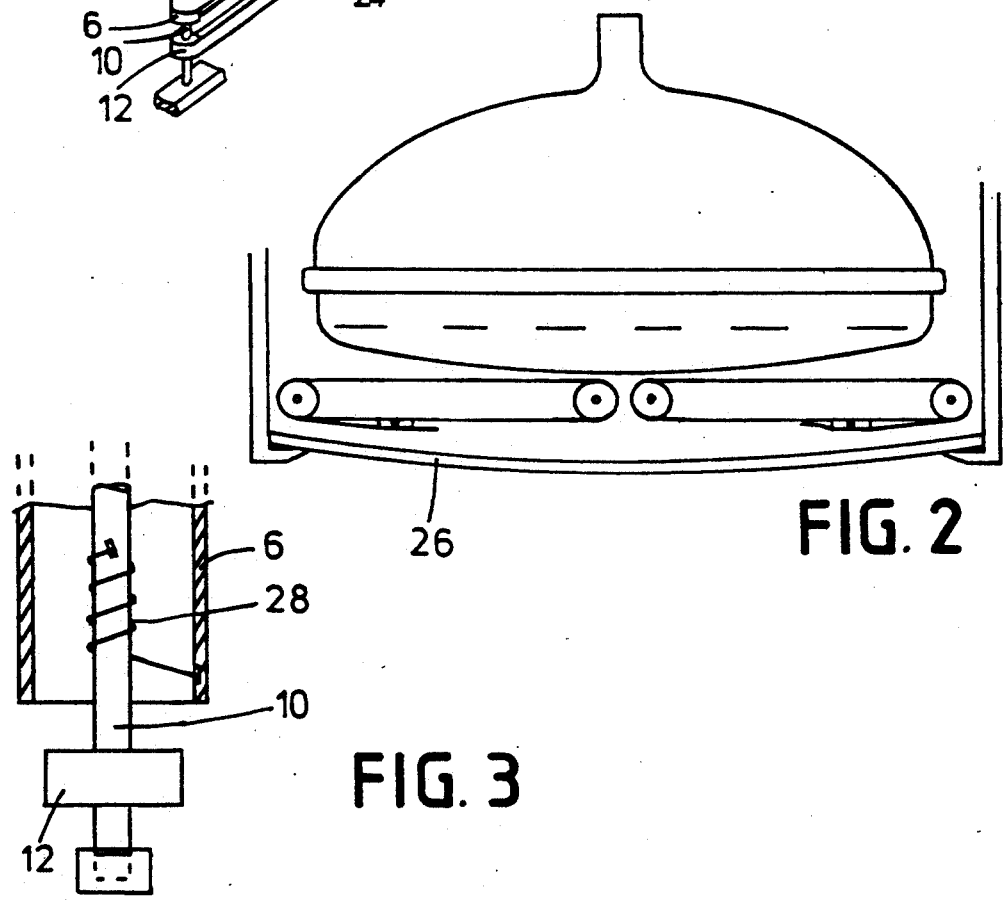
FIG. 2
FIG. 3

TV-SET HAVING SCREEN COVERING MEANS

This is a continuation of U.S. application Ser. No. 302,335, filed Jan. 27, 1989.

BACKGROUND OF THE INVENTION

The present invention relates to a television set with a cabinet and a cover element connected therewith, the cover element being positionable over the front of the picture screen. Especially years ago it was quite common that television sets had a roll-front cabinet, and by that means it was possible to shut off the picture screen when not in use. When the television is not being used the set is left with a dull grey picture screen, which is architectonically undesirable both in relation to a desired attractive appearance of the set itself and also by insistently reminding the people present in the room of the presence of the set. In a sense the roll-front cabinet was an excellent means of facilitating the opening up and shutting off the screen as desired, but in general this as well as similar cover arrangements have been abandoned, e.g. simple doors in front of the picture tube, because there is no special user demand for the presence of such devices. The users have gradually accepted the visual presence of the picture screen, also when in its switched off mode it only has a dull grey appearance and, even when given the possibility of closing a screen cover element, the users generally do not utilize this facility.

The users have additionally and accordingly got used to accepting that when switching the set on or off certain picture distortions occur.

By the present invention it has been realized that the user will not necessarily have to take any action to achieve a desirable covering of the dull, idle picture screen, nor will be compelled to accept having to look at an underqualified picture at the beginning and ending of the periods of use of the set. According to the invention an apparatus can be provided which automatically ensures covering up the picture screen depending on whether or not the set is actually in use, i.e. purely electrically controlled. A cover arrangement for the picture screen may well be controlled depending on the set being switched on and off, respectively. According to the invention it is even possible to arrange this control such that the cover arrangement after switch-on of the set does not open until the picture has been perfectly established, respectively that the covering be activated immediately at switch-off while the fading of the picture is automatically delayed until the covering has been completed, such that the user at switch on and off of the set will not experience the incorrect picture reproduction occurring during the respective initial and final phases. In the same way as in a cinema with a screen curtain the user will experience that a fully established picture is shown from the start, just as it is a full and undistorted picture that is covered at the end.

In addition it will be achieved that the picture screen is kept covered up whenever the television set is not in use, as the cover arrangement is activated in immediate or automatic response to the user's operation of the set only to switch this set on or off, i.e. the user does not have to attend especially to activating the cover arrangement. The set can comprise time delay means or sensors for the appearance of a "normal picture" after the set has been switched on, such that when switched on the screen is not uncovered until the picture has become fully established, while correspondingly the set is not caused to be switched off until the cover arrangement has managed to completely cover the picture screen. The user will thus always experience a perfect picture also in the switch-on/off phases, also achieving that the dull, grey screen will be covered any time the set is not in use, without the user having to take other action than the usual switching on and off the set, i.e. without any special attention to the operation of the cover arrangement.

The known roll-front or even corresponding doors may well constitute the cover arrangement of the present invention provided the relevant arrangement can be electrically activated. This, however, will cause various obvious inconveniences and according to a preferred embodiment of the invention a roller blind system is placed in the space between the picture screen and a front glass of the set, preferably in the form of two roller blinds which can be drawn horizontally from either side similarly to a partition curtain across a theater stage or a cinema screen. The curtain fabric or sheet is in no way required to imitate a furniture front, but may have any reasonable design as a neutral or decorative cover element, all except dull grey.

By the application of a partition curtain which is parted and gathered at the center of the picture screen a harmonious symmetrical effect at the opening and closing operation will be implied, and moreover a comparatively fast opening can be achieved, which may be adapted to a comparatively short heating time of the picture tube.

By a preferred moving mechanism for the partition curtain as described below it suffices to use a relatively small motor, and the entire curtain arrangement can be embodied in a simple and inexpensive manner.

BRIEF DESCRIPTION OF THE DRAWINGS

The invention which is further defined in the claims, is described in more detail in the following with reference to the drawing in which:

FIG. 1 is a schematic perspective view of a picture tube having a cover arrangement according to the invention, FIG. 2 is the same as seen from above, and FIG. 3 is a detailed view of the lower end of a rewinding cylinder as used in the arrangement.

DETAILED DESCRIPTION

In FIG. 1 is shown a picture tube 2, in front of which, on carrying parts not shown, in a TV-cabinet, is placed a cover arrangement comprising a dividing curtain consisting of two curtain pieces 4 mounted on respective vertical cylinders 6 at opposite sides of the picture tube screen 8. Each of the cylinders 6 is coupled up with a central shaft 10 which at the top and bottom has a driving wheel 12 which by respective belt drives 14 is connected with respective pulleys 16 close to the vertical center plane of the screen 8, but naturally placed a little above and a little below this, respectively. Through a gear box 18 the lower wheels can be driven in mutually opposite directions by a reversible motor 20.

The free edges of the curtain pieces 4 are fastened to vertical supporting bars 22, each having respective upwardly and downwardly protruding parts 24, by which they are secured to the outer run of the respective belts 14. As shown in FIG. 2 the arrangement concerned is situated in the space between the picture screen 8 and a front glass 26 of the TV-cabinet.

When the television set is turned off the curtain edges on the bars 22 are drawn tightly together at the center of the picture screen 8 such that the screen is dimmed. The motor 20 is connected with a control unit, not shown which after a certain lapse of time after switching on the set activates the motor 20 to drop the curtain edges away to their respective sides while simultaneously rolling up the curtain pieces on the cylinders 6. The actual time delay is comparatively short as it only has to suffice for the picture at the screen to establish itself in good quality. When the set is switched off the control unit ensures that the first reaction to the switching off is that the motor 20 be activated to drawing the curtains across the screen and that the actual switching off with resulting brief picture deformation does not happen till after the curtain has been closed. It might, however, be acceptable that the turning off the set be effected simultaneously with the drawing the curtains.

By the shown detailed arrangement, where the motor 20 provides both for moving the free edges of the curtain pieces 4 and for bringing about the related turnings of the rewinding cylinders 6 for winding and unwinding these pieces, the motor may be comparatively small as there will be no significant resistance to the movements. However, it may present a problem that the linear motion of the front edges of the curtains does not fully correspond to the speed by which the pieces are wound onto or unwound from the cylinders 6 if during winding or unwinding the winding diameter of the cylinders changes significantly. If it is desired to keep the curtain pieces taut, this problem, however, can easily be overcome by providing a resiliently yielding connection either between the drawing belts 14 and the related end parts 24 of the bars 22 or between the shafts 10 and the respective rewinding cylinders 6.

The latter solution is illustrated in FIG. 3 where the cylinder 6 is shown drive connected to the shaft by a torsion spring 48 facilitating the required mutual motion during constant stretching of the associated piece of curtain.

In FIG. 1 is schematically shown an on/off switch unit 46 for the TV-set and an associated delay unit 28, from which the motor 20 is energized with a required delay after 'ON' actuation for opening the curtain when the picture is ready. By 'OFF' actuation the motor 20 is energized immediately for closing the curtain, and then the TV-set is switched off when the curtain has been closed.

In connection with the switching on of the set it is possible to detect electronically the establishing of a full and fully energized picture on the screen, and in that case the unit 28 may represent a detector for this purpose.

I claim:

1. A television set with a cabinet, a picture screen accommodated in the cabinet, a cover element connected to the cabinet ad being positionable over a front of the picture screen for covering the same when the set is not in use, and control means for automatically positioning the cover element between a covering position and an uncovering position in response to a switching off and on of the television set, respectively, and wherein the control means are designed so as to arcuate, in response to the switching on of the television set, a removal of the cover element from the picture screen with such a delay that the actuation is initiated only after a picture has been fully established on the picture screen.

2. A television set according to claim 1, wherein the control means are designed to respond to a switching off of the set by first actuating the cover element to be moved into a closed position and then causing the television set to be switched off.

3. A television set with a cabinet, a picture screen accommodated in the cabinet, a cover element connected to the cabinet and being positionable over a front of the picture screen for covering the same when the set is not in use, and control means for automatically positioning the cover element between a covering position and an uncovering position in response to a switching off and on of the television set, respectively, wherein the cover element is placed in a space between the picture screen and a front glass provided in the cabinet.

4. A television set according to claim 3, wherein the cover element includes a roller blind or curtain mounted on rewinding members disposed outside an outer edge of the picture screen.

5. A television set according to claim 4, wherein motor means are provided for driving both a free curtain edge inwardly over and away from the picture screen and means for rolling and unrolling the curtain, respectively.

6. A television set according to claim 5, wherein the curtain is divided into two parts, and wherein each part of the curtain is connected with an associated rewinding member at either side of the picture screen.

7. A television set according to one of claims 5 or 6, wherein resiliently yielding members are inserted in a drive connection between the motor means and either the free curtain edge or the respective rewinding mean members.

8. A television set according to claim 7, wherein the resiliently yielding members include a torsion spring means inserted between the motor means and the rewinding members.

9. A television set with a cabinet, a picture screen accommodated in the cabinet, a cover element connected to the cabinet and being positionable over a front of the picture screen for covering the same when the set is not in use, and control means for automatically positioning the cover element between a covering position and an uncovering position in response to a switching off and on of the television set, respectively, and wherein the control means are designed to respond to a switching off of the set by first actuating the cover element to be moved into a closed position and then causing the television set to be switched off.

* * * * *